United States Patent
Park

(10) Patent No.: US 11,137,942 B2
(45) Date of Patent: Oct. 5, 2021

(54) MEMORY SYSTEM, MEMORY CONTROLLER, AND METHOD OF OPERATING A MEMORY SYSTEM FOR DETERMINING A NUMBER OF HIT AND MISS REQUESTS ABOUT MAP SEGMENTS IN A MAP CACHE AND DETERMINING WHETHER OR NOT TO PERFORM DATA READ OPERATION IN PARALLEL

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/749,530

(22) Filed: Jan. 22, 2020

(65) Prior Publication Data
US 2020/0401345 A1    Dec. 24, 2020

(30) Foreign Application Priority Data

Jun. 24, 2019  (KR) .......................... 10-2019-0074714

(51) Int. Cl.
*G06F 3/06*  (2006.01)
*G06F 12/0884*  (2016.01)

(52) U.S. Cl.
CPC .......... *G06F 3/0659* (2013.01); *G06F 3/0604* (2013.01); *G06F 3/0679* (2013.01); *G06F 12/0884* (2013.01); *G06F 2212/603* (2013.01)

(58) Field of Classification Search
CPC .. G06F 3/0659; G06F 3/0679; G06F 12/0884; G06F 3/0604; G06F 2212/603; G06F 12/0246; G06F 2212/1016; G06F 2212/7203; G06F 2212/7201; G06F 2212/7208

USPC ................. 711/118, 170, 137, 103, 150, 168
See application file for complete search history.

(56) References Cited

U.S. PATENT DOCUMENTS

| | | | | |
|---|---|---|---|---|
| 6,081,871 A * | 6/2000 | Hwangbo | ........... | G06F 12/0884 711/118 |
| 8,458,404 B1 * | 6/2013 | Delgross | ............. | G06F 12/0864 711/128 |
| 10,101,931 B1 * | 10/2018 | Camp | ................. | G06F 12/0866 |
| 2008/0126299 A1 * | 5/2008 | Schmuck | ............ | G06F 12/0862 |
| 2012/0216030 A1 * | 8/2012 | Fontenot | ............. | G06F 11/3409 713/100 |
| 2019/0018772 A1 * | 1/2019 | Hinrichs | ............. | G06F 12/0897 |

FOREIGN PATENT DOCUMENTS

| | | |
|---|---|---|
| KR | 10-2008-0075608 | 8/2008 |
| KR | 10-2016-0033154 | 3/2016 |
| KR | 10-2019-0089365 | 7/2019 |

* cited by examiner

*Primary Examiner* — Hong C Kim
(74) *Attorney, Agent, or Firm* — IP & T Group LLP

(57) ABSTRACT

Embodiments of the present disclosure relate to a memory system, a memory controller, and an operation method. The embodiments receive a plurality of requests for a memory device, determine the number of hit requests and the number of miss requests with respect to the plurality of received requests, and determine whether or not to perform all or some of map data read operations for the respective miss requests in parallel and whether or not to perform all or some of user data read operations for the respective hit requests in parallel, thereby minimizing the time required for processing the plurality of requests.

20 Claims, 15 Drawing Sheets

MEMORY SYSTEM, MEMORY CONTROLLER, AND METHOD OF OPERATING A MEMORY SYSTEM FOR DETERMINING A NUMBER OF HIT AND MISS REQUESTS ABOUT MAP SEGMENTS IN A MAP CACHE AND DETERMINING WHETHER OR NOT TO PERFORM DATA READ OPERATION IN PARALLEL

CROSS REFERENCE TO RELATED APPLICATION

The present application claims priority under 35 U.S.C. 119(a) to Korean patent application number 10-2019-0074714, filed on Jun. 24, 2019, which is incorporated herein by reference in its entirety.

BACKGROUND OF THE INVENTION

1. Field of the Invention

Embodiments of the present disclosure relate to a memory system, a memory controller, and an operation method.

2. Description of the Prior Art

A memory system stores data on the basis of a request by a host such as a computer, a mobile terminal (e.g., a smart phone, a tablet PC, or the like), or any of various other electronic devices. The memory system may include a device for storing data in a non-volatile memory, such as a solid state drive (SSD), a universal flash storage (UFS) device, an embedded MMC (eMMC) device, or the like, as well as a device that stores data in a magnetic disk, such as a hard disk drive (HDD).

The memory system may further include a memory controller for controlling the memory device. The memory controller may receive a command from a host, and, on the basis of the received command, may perform or control operations of reading, writing, or erasing data from or to a volatile memory or a non-volatile memory in the memory system. In addition, the memory controller may drive firmware for performing logical operations to execute or control these operations.

Conventional memory systems process many requests to perform operations of reading, writing, or erasing data. A request indicates details of any of the above-described operations to the memory device. In this case, it takes a long time for the conventional memory system to determine a processing order of the requests and to read map data necessary for processing each of the requests.

SUMMARY OF THE INVENTION

Embodiments of the present disclosure may provide a memory system, a memory controller, and an operation method capable of minimizing a time required to process a plurality of requests.

In addition, embodiments of the present disclosure may provide a memory system, a memory controller, and an operation method capable of quickly determining the number of requests, which are hit on the map cache, and the number of requests, which are missed on the map cache.

In one aspect, embodiments of the present disclosure may provide a memory system including a memory device including a plurality of planes and a memory controller.

The memory controller may receive a plurality of requests for the memory device.

The memory controller may receive a plurality of requests for the memory device.

The memory controller may determine, among the plurality of requests, the number of hit requests that hit on any of map segments loaded in a map cache and the number of miss requests that do not hit on any of the map segments loaded in the map cache.

Based on the number of hit requests and the number of miss requests, the memory controller may determine whether or not to perform all or some of map data read operations for the respective miss requests in parallel and whether or not to perform all or some of user data read operations for the respective hit requests in parallel.

When the number of the miss requests is greater than or equal to a first threshold count, the memory controller may perform all or some of the map data read operations for the miss requests in parallel.

When the memory controller performs all or some of the map data read operations for the miss requests in parallel, the memory controller may process all or some of the map data read operations for the miss requests on different planes in the memory device.

In this case, pages in which map data for the respective miss requests is stored may be different from each other.

In this case, a memory cell array in which map data for each of the miss requests is stored may be configured of single-level cells.

When the number of hit requests is greater than or equal to a second threshold count, the memory controller may perform all or some of the user data read operations for the hit request in parallel.

The memory controller may determine whether or not a target request, among the plurality of requests, hits on any of the map segments loaded in the map cache, based on a logical address area corresponding to each of the map segments loaded in the map cache.

The memory controller may determine whether or not a target request, among the plurality of requests, hits on any of the map segments loaded in the map cache, based on representative information corresponding to each of the map segments loaded in the map cache.

In this case, the representative information corresponding to each of the map segments may include a start-logical address and an end-logical address of a logical address area for each of the map segments.

In this case, the representative information corresponding to each of the map segments may include a code, which is a result value obtained by performing an operation on a logical address included in each of the map segments.

In another aspect, embodiments of the present disclosure may provide a memory controller including a memory interface configured to communicate with a memory device including a plurality of planes and a control circuit.

The control circuit may receive a plurality of requests for the memory device.

The control circuit may determine, among the plurality of requests, a number of hit requests that hit on any of map segments loaded in a map cache and a number of miss requests that do not hit on any of the map segments loaded in the map cache.

Based on the number of hit requests and the number of miss requests, the control circuit may determine whether or not to perform all or some of map data read operations for the respective miss requests in parallel and whether or not to perform all or some of user data read operations for the respective hit requests in parallel.

When the number of the miss requests is greater than or equal to a first threshold count, the control circuit may perform all or some of the map data read operations for the miss requests in parallel.

When the control circuit performs all or some of the map data read operations for the miss requests in parallel, the control circuit may process all or some of the map data read operations for the miss requests on different planes included in the memory device.

In this case, pages in which map data for the respective miss requests is stored may be different from each other.

In this case, a memory cell array in which map data for each of the miss requests is stored may be configured of single-level cells.

If the number of hit requests is equal to or greater than a second threshold count, the control circuit may process all or some of the user data read operations for the hit request in parallel.

The control circuit may determine whether or not a target request, among the plurality of requests, hits on any of the map segments loaded in the map cache, based on a logical address area corresponding to each of the map segments loaded in the map cache.

The control circuit may determine whether or not a target request, among the plurality of requests, hits on any of the map segments loaded in the map cache, based on representative information corresponding to each of the map segments loaded in the map cache.

In this case, the representative information corresponding to each of the map segments may include a start-logical address and an end-logical address of a logical address area for each of the map segments.

In this case, the representative information corresponding to each of the map segments may include a code, which is a result value obtained by performing an operation on a logical address included in each of the map segments.

In another aspect, embodiments of the present disclosure may provide a method of operating a memory system including a memory device including a plurality of planes and a memory controller configured to control the memory device.

The method of operating a memory system may include a step of receiving, by the memory controller, a plurality of requests for the memory device.

The method of operating a memory system may include a step of determining, among the plurality of requests, the number of hit requests that hit on any of map segments loaded in a map cache and the number of miss requests that do not hit on any of the map segments loaded in the map cache.

The method of operating a memory system may include a step of, based on the number of hit requests and the number of miss requests, determining whether or not to perform all or some of map data read operations for the respective miss requests in parallel and whether or not to perform all or some of user data read operations for the respective hit requests in parallel.

In another aspect, embodiments of the present disclosure may provide a memory system including a memory device configured to perform parallel map segment read operations on different planes among plural planes storing user data and a set of map segments.

The memory system may include a map cache configured to cache a subset of the set.

The memory system may include a control circuit configured to control the memory device to perform sequential map segment read operations in response to a specific number of requests respectively, when a threshold number or greater of cache hits occur, within the subset, on logical addresses provided along with the requests.

According to embodiments of the present disclosure, it is possible to minimize a time required to process a plurality of requests.

In addition, according to embodiments of the present disclosure, it is possible to quickly determine the number of requests that are hit on the map cache and the number of requests that are missed on the map cache.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Various embodiments of the disclosure are described below in detail with reference to the accompanying drawings. Throughout the specification, reference to "an embodiment" or the like is not necessarily to only one embodiment, and different references to any such phrase are not necessarily to the same embodiment(s).

Figure 1:
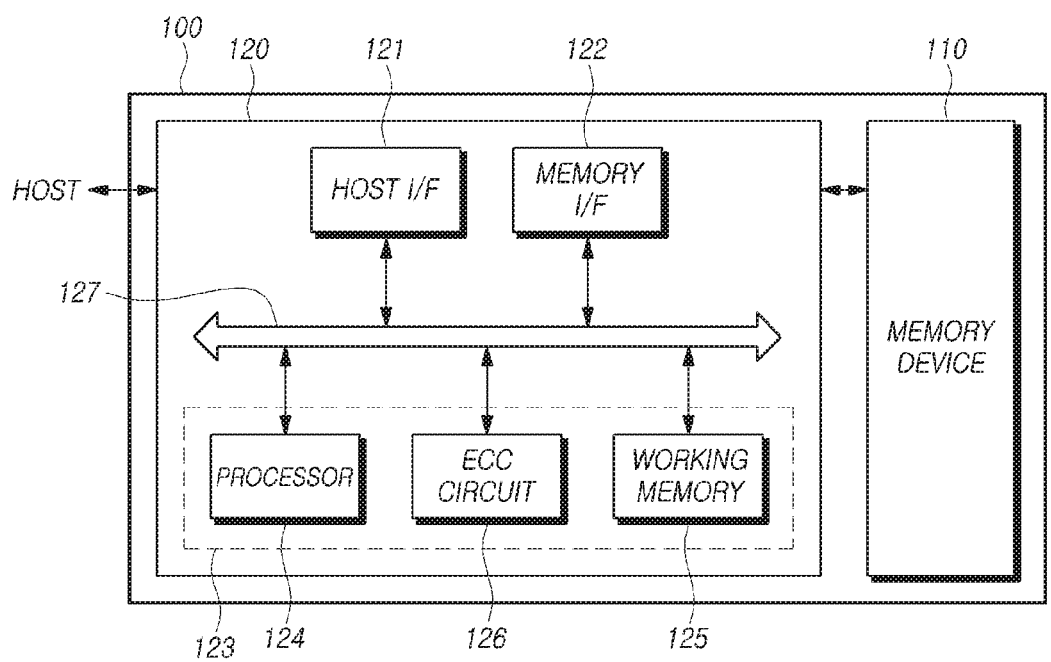
FIG. 1 is a diagram schematically illustrating the configuration of a memory system according to an embodiment of the present disclosure.

FIG. 1 is a diagram schematically illustrating the configuration of a memory system 100 according to an embodiment of the present disclosure.

Referring to FIG. 1, the memory system 100 may include a memory device 110 for storing data, a memory controller 120 for controlling the memory device 110, and the like.

The memory device 110 includes a plurality of memory blocks and operates in response to the control of the memory controller 120. In this case, the operation of the memory device 110 may include, for example, a read operation, a program operation (also, referred to as a "write operation"), an erasure operation, and the like.

The memory device 110 may include a memory cell array including a plurality of memory cells (hereinafter, simply referred to as "cells") that store data. Such a memory cell array may exist inside the memory block.

For example, the memory device 110 may be implemented as any of various types, such as double data rate synchronous dynamic random access memory (DDR SDRAM), low power double data rate 4 (LPDDR4) SDRAM, graphics double data rate (GDDR) SDRAM, a low power DDR (LPDDR), rambus dynamic random access memory (RDRAM), NAND flash memory, vertical NAND, NOR flash memory, resistive random access memory (RRAM), phase-change memory (PRAM), magnetoresistive random access memory (MRAM), ferroelectric random access memory (FRAM), spin transfer torque random access memory (STT-RAM), and the like.

The memory device 110 may be implemented as a three-dimensional array structure. Embodiments of the disclosure may be applied to a charge trap flash (CTF) in which a charge storage layer is formed of an insulating film, as well as to a flash memory device in which the charge storage layer is formed of a conductive floating gate.

The memory device 110 is configured to receive a command, an address, and the like from the memory controller 120 and to access an area selected by an address in the memory cell array. That is, the memory device 110 may perform an operation corresponding to a command on the area selected by the address.

For example, the memory device 110 may perform a program operation, a read operation, an erasure operation, and the like. In this regard, during the program operation, the memory device 110 programs data in the area selected by the address. In the read operation, the memory device 110 reads data from the area selected by the address. In the erasure operation, the memory device 110 erases data stored in the area selected by the address.

The memory controller 120 may control write (program), read, erase, and background operations on the memory device 110. The background operation may include, for example, at least one of a garbage collection (GC), wear leveling (WL), bad block management (BBM), and the like.

The memory controller 120 may control the operation of the memory device 110 according to a request of a host (HOST). Alternatively, the memory controller 120 may control the operation of the memory device 110, regardless of the request of the host.

The memory controller 120 and the host may be separate devices. In some cases, the memory controller 120 and the host may be integrated into one device. In the following description, by way of example, the memory controller 120 and the host are considered as being separate from each other.

Referring to FIG. 1, the memory controller 120 may include a memory interface 122, a control circuit 123, and the like, and may further include a host interface 121 and the like.

The host interface 121 provides an interface for communication with the host.

The control circuit 123 may receive a command from the host through the host interface 121, and may process the received command.

The memory interface 122 is connected to the memory device 110 so as to provide an interface for communication with the memory device 110. That is, the memory interface 122 may be configured to provide an interface between the memory device 110 and the memory controller 120 in response to the control of the control circuit 123.

The control circuit 123 performs overall control operation of the memory controller 120, thereby controlling the memory device 110. To this end, for example, the control circuit 123 may include at least one of a processor 124, a working memory 125, and the like. In some cases, the control circuit 123 may further include an error detection and correction circuit (ECC circuit) 126.

The processor 124 may control overall operation of the memory controller 120, and may perform logical operations. The processor 124 may communicate with the host through the host interface 121, and may communicate with the memory device 110 through the memory interface 122.

The processor 124 may perform a function of a flash translation layer (FTL). The processor 124 may convert a logical block address (LBA) provided by the host into a physical block address (PBA) through the flash translation layer (FTL). The flash translation layer (FTL) may receive a logical block address (LBA), and may convert the same into a physical block address (PBA) by means of a mapping table.

There are several methods of mapping the addresses by the flash translation layer depending on a mapping unit. Typical address mapping methods include a page mapping method, a block mapping method, and a hybrid mapping method.

The processor 124 is configured to randomize the data received from the host. For example, the processor 124 may randomize data received from the host using a randomizing seed. The randomized data is provided to the memory device 110 as data to be stored, and is programmed in the memory cell array.

The processor 124 is configured to derandomize data received from the memory device 110 during a read operation. For example, the processor 124 may derandomize the data received from the memory device 110 using the derandomizing seed. The derandomized data may be output to the host.

The processor 124 may execute firmware (FW) to control the operation of the memory controller 120. In other words, the processor 124 may execute (drive) the firmware loaded in the working memory 125 when booting in order to control overall operation of the memory controller 120 and perform logical operation.

The firmware is a program executed in the memory system 100, and may include various functional layers.

For example, the firmware may include at least one of a flash translation layer (FTL) that performs conversion between a logical address requested by the host to the memory system 100 and a physical address of the memory device 110, a host interface layer (HIL) that interprets a command requested by the host to the memory system 100 as a storage device and transmits the same to the flash translation layer (FTL), a flash interface layer (FIL) that transmits a command indicated by the flash translation layer (FTL) to the memory device 110, and the like.

The firmware, for example, may be stored in the memory device 110, and may then be loaded in the working memory 125.

The working memory 125 may store firmware, program code, commands, or data necessary for driving the memory controller 120. The working memory 125 may include, for example, as a volatile memory, at least one of static RAM (SRAM), dynamic RAM (DRAM), synchronous DRAM (SDRAM), and the like.

The error detection and correction circuit 126 may be configured to detect an error bit of the data to be checked using error correction code and to correct the detected error bit. Here, the data to be checked may be, for example, data stored in the working memory 125 or data read from the memory device 110.

The error detection and correction circuit 126 may be implemented so as to decode the data with the error correction code. The error detection and correction circuit 126 may be implemented as any of various code decoders. For example, a decoder that performs unsystematic code decoding or a decoder that performs systematic code decoding may be used.

For example, the error detection and correction circuit 126 may detect one or more error bits in sector units for each piece of read data. That is, each piece of read data may include a plurality of sectors. The sector may mean a smaller data unit than a page, which is a read unit of the flash memory. The sectors constituting each piece of read data may correspond to each other through addresses.

The error detection and correction circuit 126 may produce a bit error rate (BER), and may determine whether correction is possible in units of sectors. If the bit error rate (BER) is higher than a reference value, the error detection and correction circuit 126 may determine that the corresponding sector is uncorrectable (failed). On the other hand, if the bit error rate (BER) is lower than a reference value, the error detection and correction circuit 126 may determine that the corresponding sector is correctable (passed).

The error detection and correction circuit 126 may sequentially perform the error detection and correction operation on all read data. If the sector included in the read data is correctable, the error detection and correction circuit 126 may omit the error detection and correction operation on the corresponding sector for the next read data. If the error detection and correction operation for all read data is completed as described above, the error detection and correction circuit 126 may detect a sector determined to be uncorrectable to be the last. One or more sectors may be determined to be uncorrectable. The error detection and correction circuit 126 may transmit information about the sectors determined to be uncorrectable (ex. address information) to the processor 124.

The bus 127 may be configured to provide a channel between the components 121, 122, 124, 125, and 126 of the memory controller 120. The bus 127 may include, for example, a control bus for transmitting various control signals, commands, and the like, and a data bus for transmitting a variety of data.

The above-described components 121, 122, 124, 125, and 126 of the memory controller 120 represent an exemplary configuration. In some cases, one or more of these components 121, 122, 124, 125, and 126 of the memory controller 120 may be excluded, or may be integrated into one element. In some cases, one or more other components may be added in addition to the aforementioned components of the memory controller 120.

The memory device 110 is described in more detail with reference to FIG. 2.

Figure 2:
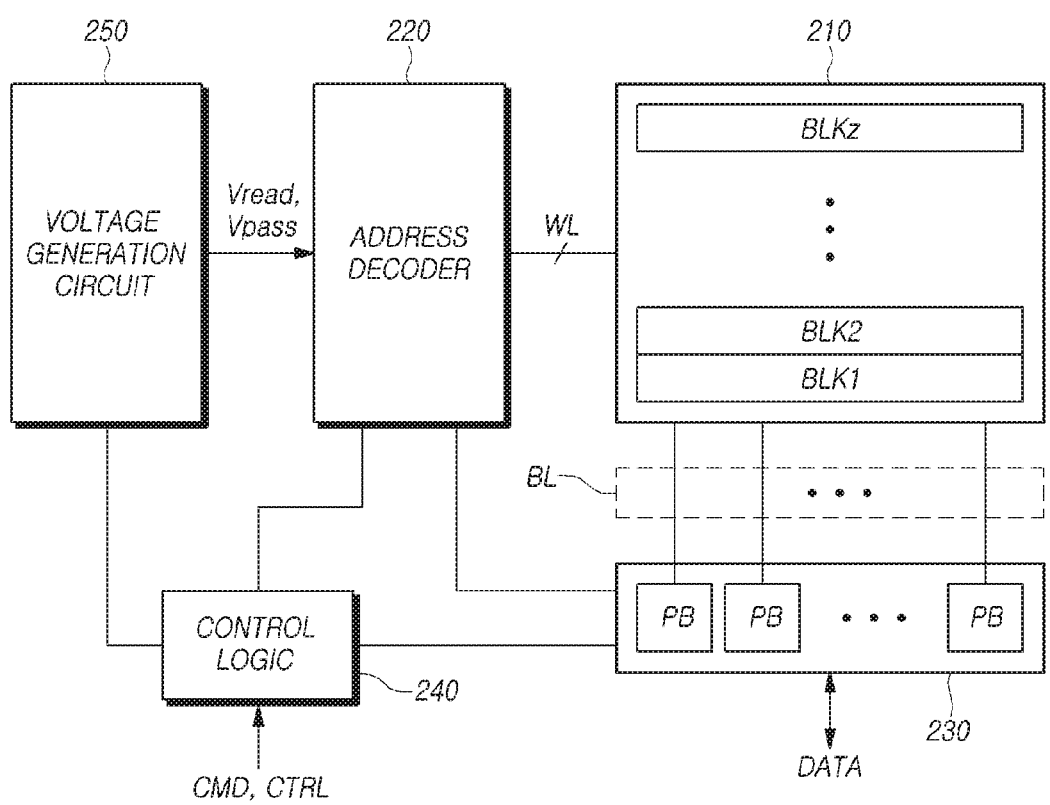
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read-and-write circuit 230, control logic 240, and a voltage generation circuit 250.

The memory cell array 210 may include a plurality of memory blocks (BLK1) to (BLKz) (where, z is a natural number of 2 or more).

In the plurality of memory blocks (BLK1) to (BLKz), a plurality of word lines (WL) and a plurality of bit lines (BL) may be disposed in an intersecting arrangement, and a plurality of memory cells (MC) may be arranged at the respective intersections.

The plurality of memory blocks (BLK1) to (BLKz) may be connected to the address decoder 220 through the plurality of word lines (WL). The plurality of memory blocks (BLK1) to (BLKz) may be connected to the read-and-write circuit 230 through the plurality of bit lines (BL).

Each of the plurality of memory blocks (BLK1) to (BLKz) may include a plurality of memory cells. For example, the plurality of memory cells may be non-volatile memory cells having a vertical channel structure.

The memory cell array 210 may be configured as a two-dimensional structure, or in some cases, may be configured as a three-dimensional structure.

Each of the plurality of memory cells in the memory cell array 210 may store at least one bit of data. For example, each such memory cell may be a single-level cell (SLC) that stores one bit of data, a multi-level cell (MLC) that stores two bits of data, a triple-level cell (TLC) that stores three bits of data, or a quad-level cell (QLC) that stores 4 bits of data. As another example, the memory cell array 210 may include a plurality of higher storage capacity memory cells each storing five or more bits of data.

Referring to FIG. 2, the address decoder 220, the read-and-write circuit 230, the control logic 240, and the voltage generation circuit 250, may collectively operate as a peripheral circuit for driving the memory cell array 210.

The address decoder 220 may be connected to the memory cell array 210 through a plurality of word lines (WL).

The address decoder 220 may be configured to operate in response to the control of the control logic 240.

The address decoder 220 may receive addresses through an input/output buffer inside the memory device 110. The address decoder 220 may be configured to decode a block address, among the received addresses. The address decoder 220 may select at least one memory block according to the decoded block address.

The address decoder 220 may receive a read voltage (Vread) and a pass voltage (Vpass) from the voltage generation circuit 250.

In the case of applying a read voltage during the read operation, the address decoder 220 may apply a read voltage (Vread) to a selected word line (WL) in a selected memory block, and may apply a pass voltage (Vpass) to the remaining unselected word lines (WL).

In a program verification operation, the address decoder 220 may apply a verification voltage generated from the voltage generation circuit 250 to a selected word line (WL) in the selected memory block, and may apply a pass voltage (Vpass) to the remaining unselected word lines (WL).

The address decoder 220 may be configured to decode column addresses of the received addresses. The address decoder 220 may transmit the decoded column addresses to the read-and-write circuit 230.

The read operation and the program operation of the memory device 110 may be performed in units of pages. The address received when requesting the read operation and the program operation may include at least one of a block address, a row address, and a column address.

The address decoder 220 may select one memory block and one word line according to the block address and the row address. The column address may be decoded by the address decoder 220 to be provided to the read-and-write circuit 230.

The address decoder 220 may include at least one of a block decoder, a row decoder, a column decoder, an address buffer, and the like.

The read-and-write circuit 230 may include a plurality of page buffers (PB). The read-and-write circuit 230 may operate as a "read circuit" during the read operation of the memory cell array 210, and may operate as a "write circuit" during the write operation.

The above-described read-and-write circuit 230 may also be referred to as a "page buffer circuit" or a "data register circuit" Including a plurality of page buffers (PB). Here, the read-and-write circuit 230 may include a data buffer for a function of data processing, and in some cases, may further include a cache buffer for a caching function.

A plurality of page buffers (PB) may be connected to the memory cell array 210 through a plurality of bit lines (BL). In order to sense threshold voltages (Vths) of the memory cells during the read operation and the program verification operation, the plurality of page buffers (PB) may continue to supply a sensing current to the bit lines (BL) connected to the memory cells, and may detect a change in the amount of current flowing according to the program state of the corresponding memory cell through a sensing node to then be latched as sensing data.

The read-and-write circuit 230 may operate in response to page buffer control signals output from the control logic 240.

In the read operation, the read-and-write circuit 230 senses data of the memory cell to temporarily store the read data, and then outputs the data (DATA) to the input/output buffer of the memory device 110. In an embodiment, the read-and-write circuit 230 may include a column selection circuit, as well as the page buffers (PBs) or page registers.

The control logic 240 may be connected to the address decoder 220, the read-and-write circuit 230, the voltage generation circuit 250, and the like. The control logic 240 may receive a command (CMD) and a control signal (CTRL) through an input/output buffer of the memory device 110.

The control logic 240 may be configured to control overall operation of the memory device 110 in response to the control signal (CTRL). The control logic 240 may output a control signal for adjusting the precharge potential levels of the sensing nodes of the plurality of page buffers (PB).

The control logic 240 may control the read-and-write circuit 230 so as to perform a read operation of the memory cell array 210. The voltage generation circuit 250 may generate a read voltage (Vread) and a pass voltage (Vpass) used in the read operation in response to the voltage generation circuit control signal output from the control logic 240.

Figure 3:
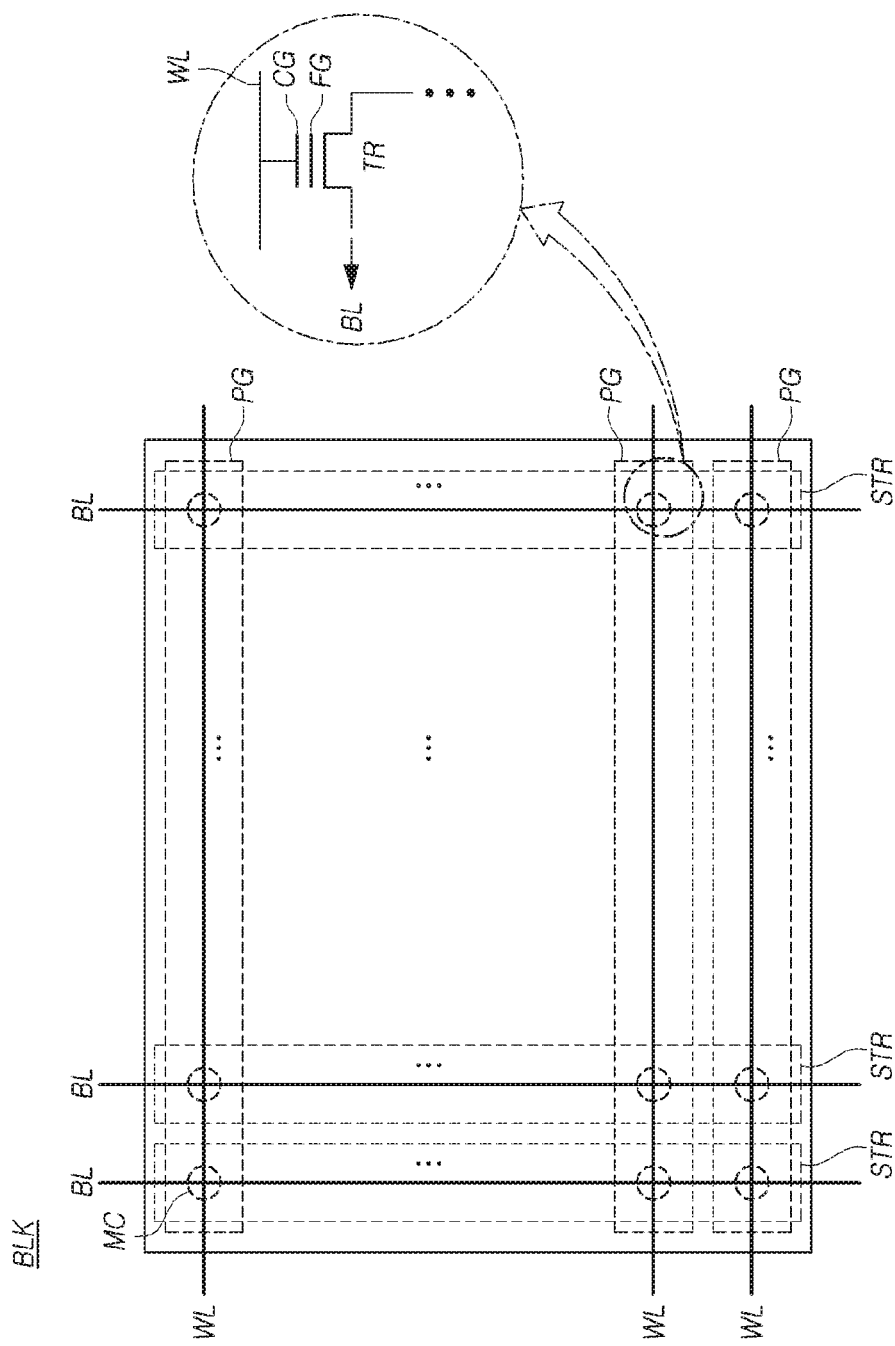
FIG. 3 is a diagram schematically illustrating respective memory blocks of a memory device according to an embodiment of the present disclosure.

FIG. 3 is a diagram schematically illustrating each memory block (BLK) of a memory device 110 according to an embodiment.

Referring to FIG. 3, the memory block (BLK) included in the memory device 110 may be configured as, for example, a plurality of pages (PG) and a plurality of strings (STR) intersecting with each other.

The plurality of pages (PGs) corresponds to the plurality of word lines (WL), and the plurality of strings (STR) corresponds to the plurality of bit lines (BL).

The plurality of word lines (WL) and the plurality of bit lines (BL) may be arranged to intersect with each other in the memory block (BLK). For example, the plurality of word lines (WL) may be arranged in a row direction, and the plurality of bit lines (BL) may be arranged in a column direction. As another example, the plurality of word lines (WL) may be arranged in a column direction, and the plurality of bit lines (BL) may be arranged in a row direction.

The plurality of word lines (WL) and the plurality of bit lines (BL) intersect with each other, thereby defining a plurality of memory cells (MC). A transistor (TR) may be disposed in each memory cell (MC).

For example, the transistor (TR) disposed in each memory cell (MC) may include a drain, a source, a gate, and the like. The drain (or source) of the transistor (TR) may be connected to a corresponding bit line (BL) directly or via another transistor (TR). The source (or drain) of the transistor (TR) may be connected to the source line (which may be the ground) directly or via another transistor (TR). The gate of the transistor (TR) may include a floating gate (FG) surrounded by an insulator and a control gate (CG) to which a gate voltage is applied from the word line (WL).

Each of the plurality of memory blocks (BLK1) to (BLKz) may further include a first selection line (also referred to as a "source selection line" or a "drain selection line") arranged outside a first outermost word line that is closer to the read-and-write circuit 230 and a second selection line (also referred to as a "drain selection line" or a "source selection line") arranged outside a second outermost word line.

In some cases, one or more dummy word lines may be further arranged between the first outermost word line and the first selection line. In addition, one or more dummy word lines may be further arranged between the second outermost word line and the second selection line.

With a memory block structure as shown in FIG. 3, the read operation and the program operation (write operation) may be performed in units of pages, and the erasure operation may be performed in units of memory blocks.

Figure 4:
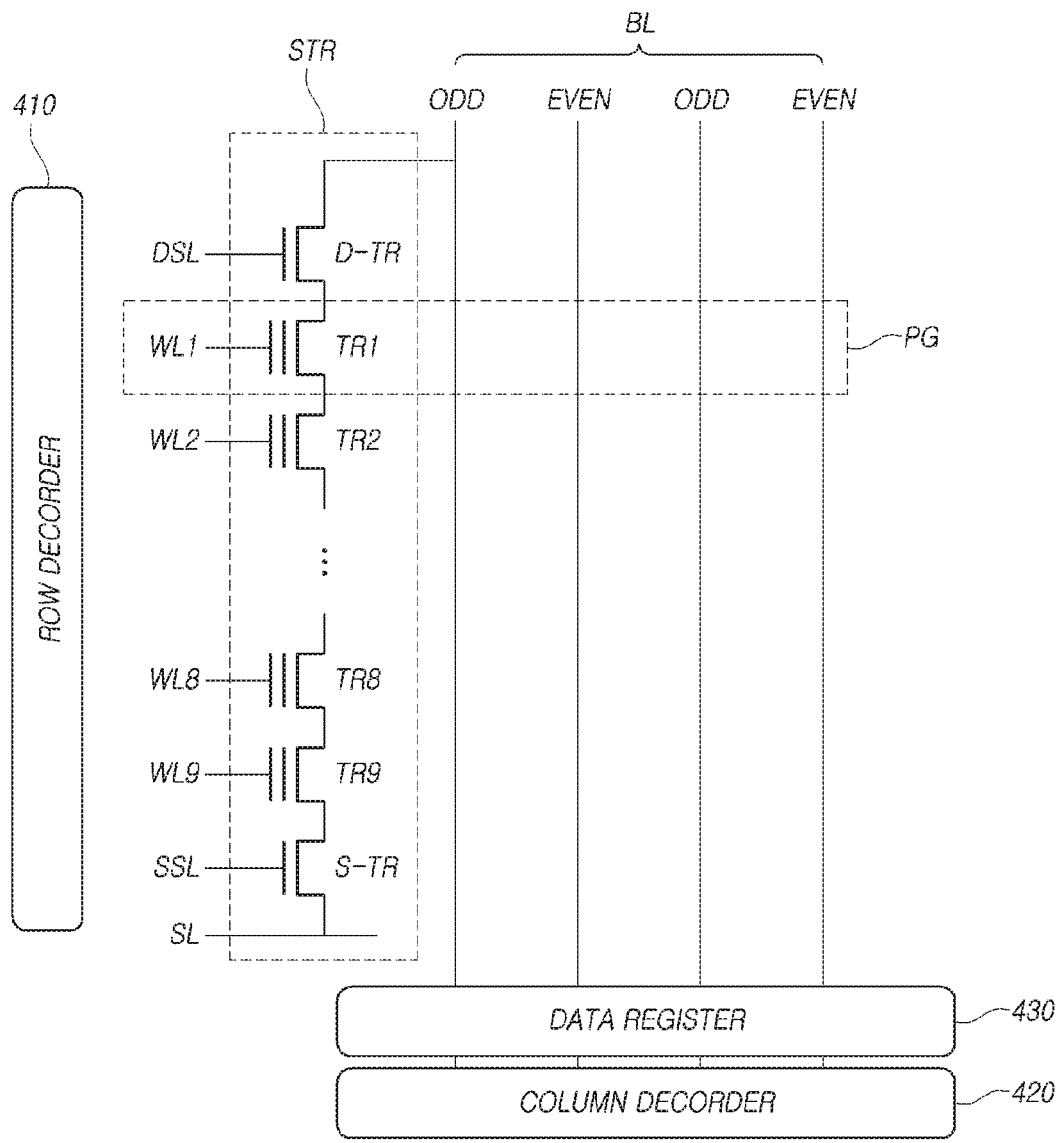
FIG. 4 is a diagram illustrating the structure of a word line and a bit line of a memory device according to an embodiment of the present disclosure.

FIG. 4 is a diagram illustrating the structure of a word line (WL) and a bit line (BL) of a memory device 110 according to an embodiment of the present disclosure.

Referring to FIG. 4, the memory device 110 includes a core area in which the memory cells (MC) are gathered and an auxiliary area, which corresponds to the area excluding the core area, for supporting the operation of the memory cell array 210.

The core area may include pages (PG) and strings (STR). In the core area, a plurality of word lines (WL1 to WL9) and a plurality of bit lines (BL) are arranged to intersect with each other.

The plurality of word lines (WL1 to WL9) may be connected to a row decoder 410, and the plurality of bit lines (BL) may be connected to a column decoder 420. A data register 430 corresponding to the read-and-write circuit 230 may be provided between the plurality of bit lines (BL) and the column decoder 420.

The plurality of word lines (WL1 to WL9) correspond to the plurality of pages (PG).

For example, as illustrated in FIG. 4, each of the plurality of word lines (WL1 to WL9) may correspond to one page (PG). Alternatively, if each of the plurality of word lines (WL1 to WL9) has a large size, each of the plurality of word lines (WL1 to WL9) may correspond to two or more (e.g., two or four) pages (PG). The page (PG) may be a minimum unit for performing the program operation and the read operation. All the memory cells (MC) in the same page (PG) may simultaneously perform operations during the program operation and the read operation.

The plurality of bit lines (BL) may be divided into odd bit lines (BL) and even bit lines (BL), which may be connected to the column decoder 420.

In order to access the memory cell (MC), an address may first enter a core area through the row decoder 410 and the column decoder 420 via an input/output terminal, and may designate a target memory cell. Designating the target memory cell means making access to the memory cell (MC) in the site where the word lines (WL1 to WL9) connected to the row decoder 410 and the bit lines (BL) connected to the column decoder 420 intersect with each other in order to program data thereto or read programmed data therefrom.

The pages (PG) in the first direction (e.g., the X-axis direction) are bound by means of a common line of a word line (WL), and the strings (STR) in the second direction (e.g., the Y-axis direction) are bound (connected) by means of a common line of a bit line (BL). The lines bound by means of a common line mean that the lines are connected with a material having the same structure and that the same voltage is simultaneously applied to the line. In this case, the voltage applied to the foremost memory cell (MC) may be slightly different from the voltage applied to the memory cell (MC) in the middle position or applied to the rearmost memory cell (MC), which are connected in series, due to voltage drop.

Since all data processing of the memory device 110 is performed by programming and reading through the data register 430, the data register 430 plays a pivotal role. If the data processing of the data register 430 is slow, all other areas must wait until the data register 430 completes the data processing. In addition, if the performance of the data register 430 deteriorates, the overall performance of the memory device 110 may be lowered.

Referring to the example in FIG. 4, one string (STR) may have a plurality of transistors (TR1 to TR9) connected to a plurality of word lines (WL1 to WL9). The areas in which the plurality of transistors (TR1 to TR9) is provided correspond to memory cells (MC). The plurality of transistors (TR1 to TR9) is a transistor including a control gate (CG) and a floating gate (FG) as described above.

The plurality of word lines (WL1 to WL9) includes two outermost word lines (WL1) and (WL9). In terms of a signal path, a first selection line (DSL) may be further arranged outside the first outermost word line (WL1) that is closer to the data register 430, and a second selection line (SSL) may be further arranged outside the second outermost word line (WL9), among the two outermost word lines (WL1) and (WL9).

A first selection transistor (D-TR) that is turned on and off by the first selection line (DSL) has only a gate electrode connected to the first selection line (DSL) and does not include a floating gate (FG). A second selection transistor (S-TR) that is turned on and off by the second selection line (SSL) has only a gate electrode connected to the second selection line (SSL) and does not include a floating gate (FG).

The first selection transistor (D-TR) serves as a switch to turn on or off the connection between a corresponding string (STR) and the data register 430. The second selection transistor (S-TR) serves as a switch to turn on or off the connection between a corresponding string (STR) and a source line (SL). That is, the first select transistor (D-TR) and the second select transistor (S-TR) are provided at both ends of the string (STR) and serve as gatekeepers for connecting and disconnecting signals.

Since the memory system 100 must fill electrons in the target memory cell (MC) of the bit line (BL) to be programmed during the program operation, the memory system 100 applies a set turn-on voltage (Vcc) to the gate electrode of the first selection transistor (D-TR), thereby turning on the first selection transistor (D-TR), and applies a set turn-off voltage (e.g., 0V) to the gate electrode of the second selection transistor (S-TR), thereby turning off the second selection transistor (S-TR). The turn-on and turn-off voltages may be predetermined.

The memory system 100 turns on both the first selection transistor (D-TR) and the second selection transistor (S-TR) during a read operation or a verification operation. Accordingly, a current may pass through the corresponding string (STR) to the source line (SL) corresponding to the ground, so that the voltage level of the bit line (BL) may be measured. However, in the read operation, there may be a difference in the on-off timing between the first selection transistor (D-TR) and the second selection transistor (S-TR).

The memory system 100 may supply a set voltage (e.g., +20V) to a substrate through the source line (SL) during the erasure operation. In the erasure operation, the memory system 100 floats both the first selection transistor (D-TR) and the second selection transistor (S-TR) to produce an infinite resistance. Accordingly, the structure is configured such that the roles of the first selection transistor (D-TR) and the second selection transistor (S-TR) are eliminated, and such that electrons are moved by the potential difference only between the floating gate (FG) and the substrate.

Figure 5:
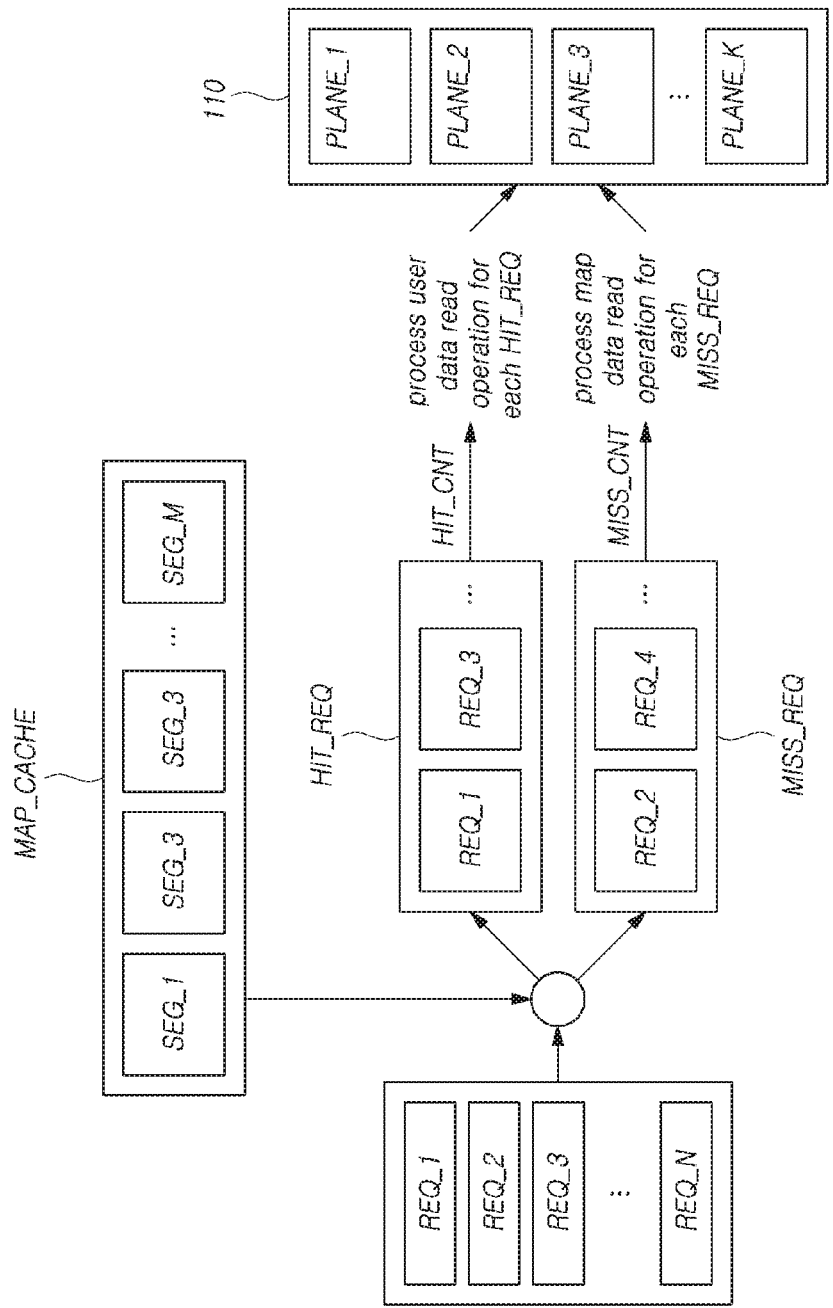
FIG. 5 is a diagram schematically illustrating the operation of a memory system according to an embodiment of the present disclosure.

FIG. 5 is a diagram schematically illustrating the operation of a memory system 100 according to an embodiment of the present disclosure.

Referring to FIG. 5, the memory controller 120 of the memory system 100 may receive a plurality of requests for the memory device 100.

In this case, the plurality of requests may be transmitted from the host (HOST), or may be generated in the memory system 100 (e.g., a request for reading a valid page during a garbage collection operation).

Each of the plurality of requests may indicate a specific operation (e.g., a data read operation) on the memory device 100. The plurality of requests may be determined according to set conditions. For example, the plurality of requests may be received from the host, or may be generated in the memory system 100 for a set period of time.

Hereinafter, it is assumed that there are N requests (N is a natural number of 2 or more) (REQ_1, REQ_2, REQ_3, ..., and REQ_N).

The memory controller 120 may determine, among the plurality of received requests, a number (HIT_CNT) of hit requests (HIT_REQ) that hit on any of the map segments loaded in the map cache (MAP_CACHE) and a number (MISS_CNT) of miss requests (MISS_REQ) that do not hit on any of the map segments loaded in the map cache (MAP_CACHE).

The map cache (MAP_CACHE) may cache mapping information such that the memory controller 120 may quickly access the corresponding mapping information between the logical address and the physical address.

In this case, the map cache (MAP_CACHE) may be located in the working memory 125 inside the memory controller 120, or may be located in a separate RAM device outside the memory controller 120.

The memory controller 120 may load M map segments (M is a natural number) (SEG_1, SEG_2, SEG_3, ..., and SEG_M) In the map cache (MAP_CACHE). Each of the map segments (SEG_1, SEG_2, SEG_3, ..., and SEG_M) loaded in the map cache (MAP_CACHE) may store one or more pieces of mapping information between a logical address value and a physical address value.

In addition, the memory controller 120 may search for the mapping information between a logical address value and a physical address value, which is required to process the received requests, from the map segments (SEG_1, SEG_2, SEG_3, ..., and SEG_M) loaded in the above-described map cache (MAP_CACHE).

In this case, if the corresponding mapping information is stored in any of the map segments (SEG_1, SEG_2, SEG_3, ..., and SEG_M) loaded in the map cache (MAP_CACHE), it may be considered that the corresponding mapping information hits on the map segment in which the information is contained.

The request referring to the corresponding mapping information may also be considered as being hit on one of the map segments (SEG_1, SEG_2, SEG_3, ..., and SEG_M) loaded in the map cache (MAP_CACHE), and the corresponding request may be expressed as a "hit request".

On the other hand, if the mapping information is not stored in any of the map segments (SEG_1, SEG_2, SEG_3, ..., and SEG_M) loaded in the map cache (MAP_CACHE), it may be considered that the corresponding mapping information is not hit on any of such map segments or misses all of the segments.

In addition, the request referring to the corresponding mapping information may be considered as not being hit in any of the map segments (SEG_1, SEG_2, SEG_3, ..., and SEG_M) loaded in the map cache (MAP_CACHE), and the corresponding request may be expressed as a "miss request".

In FIG. 5, the memory controller 120 may compare the plurality of requests (REQ_1, REQ_2, REQ_3, ..., and REQ_N) and the map segments (SEG_1, SEG_2, SEG_3, ..., and SEG_M) stored in the map cache (MAP_CACHE), and may classify the requests into hit requests (HIT_REQ) and miss requests (MISS_REQ). A method of classifying the requests into the hit requests (HIT_REQ) and the miss requests (MISS_REQ) is described in detail below with reference to FIGS. 11 to 13.

For example, the requests (REQ_1, REQ_3, ...) may be hit requests (HIT_REQ), and the requests (REQ_2, REQ_4, ...) may be miss requests (MISS_REQ).

Thereafter, the memory controller 120 may count the requests (REQ_1, REQ_3, ...) to determine the number (HIT_CNT) of hit requests (HIT_REQ), and may count the requests (REQ_2, REQ_4, ...) to determine the number (MISS_CNT) of miss requests (MISS_REQ).

The memory controller 120 may determine whether or not to perform all or some of map data read operations for the respective miss requests (MISS_REQ) in parallel, or may determine whether or not to perform all or some of user data read operations for the respective hit requests (HIT_REQ) in parallel on the basis of the number (HIT_CNT) of hit requests (HIT_REQ) and the number (MISS_CNT) of miss requests (MISS_REQ).

Since the mapping information corresponding to the hit request (HIT_REQ) has already been loaded in the map cache (MAP_CACHE), the hit request (HIT_REQ) does not require a separate map data read operation, so that a user data read operation for the corresponding request may be immediately performed.

However, since the mapping information corresponding to the miss request (MISS_REQ) does not exist in the map cache (MAP_CACHE), a map data read operation for reading the mapping information corresponding to the corresponding request from the memory device 110 is required.

Therefore, the memory controller 120 preferentially may execute map data read operations for the respective miss requests (MISS_REQ). At this time, the memory controller 120 may determine whether or not perform all or some of the map data read operations for the respective miss requests (MISS_REQ) in parallel.

In addition, the memory controller 120 may execute user data read operations for the hit requests (HIT_REQ). At this time, the memory controller 120 may determine whether or not to perform all or some of the user data read operations for the respective hit requests (HIT_REQ) in parallel.

Here, performing or processing the read operations in parallel (parallel read operations) means that the memory controller 120 makes a request to the memory device 110 for executing a plurality of read operations at the same time. On the other hand, performing or processing the data read operations in parallel (parallel read operations) may be considered as performing the data read operations by pairing or interleaving the same, and the meaning thereof is not limited by the term.

On the other hand, making a request to the memory device 110 for executing the plurality of read operations one by one may be considered as performing or processing the read operations in sequence.

In this case, the memory device 110 that receives requests for the plurality of read operations may include K planes (K is a natural number of 2 or more) (PLANE_1, PLANE_2, PLANE_3, ..., and PLANE_K). Each such plane may include one or more memory blocks. In addition, the respective planes (PLANE_1, PLANE_2, PLANE_3, ..., and PLANE_K) may operate independently from each other.

Figure 6:
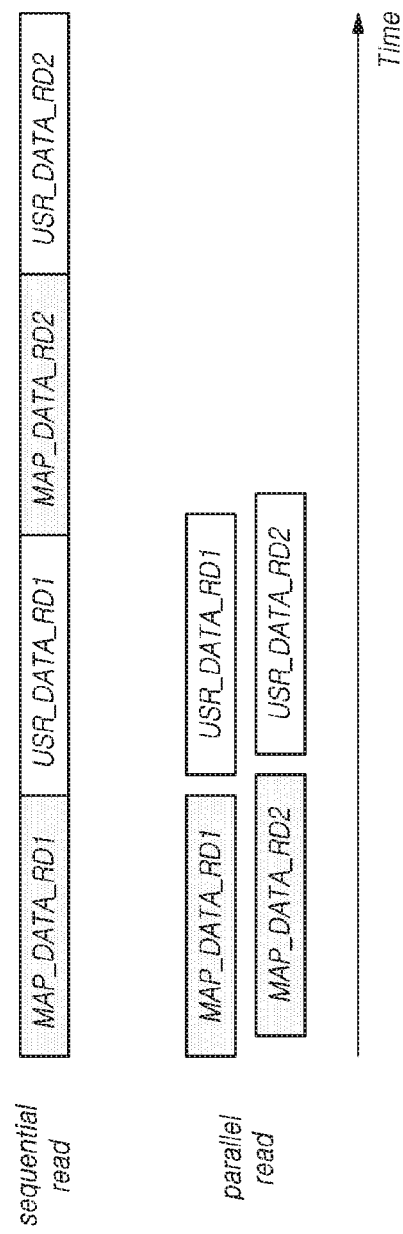
FIG. 6 is a diagram illustrating parallel processing of a read operation in a memory system according to an embodiment of the present disclosure.

FIG. 6 is a diagram illustrating parallel processing of a read operation in a memory system 100 according to an embodiment of the present disclosure.

Referring to FIG. 6, the case in which the memory controller 120 of the memory system 100 performs map data read operations (MAP_DATA_RD1) and (MAP_DA- TA_RD2) and user data read operations (USR_DATA_RD1) and (USR_DATA_RD2) is described.

In this case, it is assumed that the map data read operation (MAP_DATA_RD1) must be executed in order to execute the user data read operation (USR_DATA_RD1), and that the map data read operation (MAP_DATA_RD2) must be executed in order to execute the user data read operation (USR_DATA_RD2).

In the case where the memory controller 120 sequentially performs the read operations, the memory controller 120 may perform the user data read operation (USR_DATA_RD1) after performing the map data read operation (MAP_DATA_RD1), and may then perform the user data read operation (USR_DATA_RD2) after performing the map data read operation (MAP_DATA_RD2).

On the other hand, in the case where the memory controller 120 performs read operations in parallel, the memory controller 120 may simultaneously perform the map data read operations (MAP_DATA_RD1) and (MAP_DATA_RD2) necessary for performing the user data read operations (USR_DATA_RD1) and (USR_DATA_RD2), and may then simultaneously perform the user data read operations (USR_DATA_RD1) and (USR_DATA_RD2).

Therefore, if the memory controller 120 performs the read operations in parallel, the time required to perform all the read operations may be reduced, and the time required to process the requests corresponding to all of the read operations may also be reduced.

Figure 7:
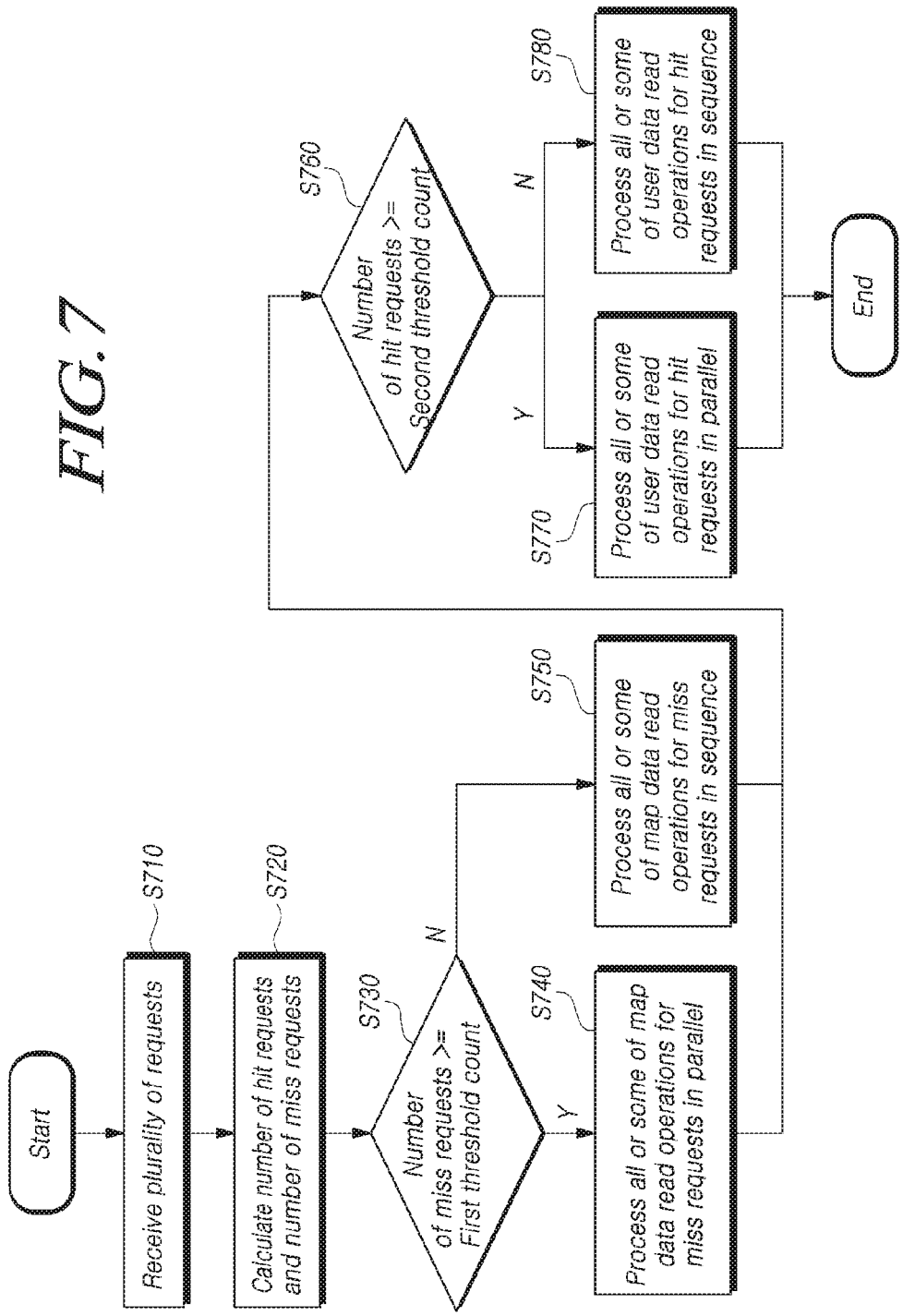
FIG. 7 is a flowchart illustrating an example of the operation of the memory system described with reference to FIG. 5.

FIG. 7 is a flowchart illustrating an example of the operation of the memory system 100 described with reference to FIG. 5.

The memory controller 120 of the memory system 100 may receive a plurality of requests with respect to the memory device 100 (S710).

The memory controller 120 may determine the number (HIT_CNT) of hit requests (HIT_REQ) and the number (MISS_CNT) of miss requests (MISS_REQ), among the received requests, as described with reference to FIG. 5 (S720).

The memory controller 120 may read map data for the miss requests (MISS_REQ) before reading user data because map data is necessary to access user data.

Then, the memory controller 120 determines whether or not the number (MISS_CNT) of miss requests (MISS_REQ) determined in operation 720 is greater than or equal to a first threshold count (S730).

If the number (MISS_CNT) of miss requests (MISS_REQ) is greater than or equal to a first threshold count ("Y" in S730), the memory controller 120 may perform all or some of the map data read operations for the miss requests (MISS_REQ) in parallel (S740).

On the other hand, if the number (MISS_CNT) of miss requests (MISS_REQ) is less than the first threshold count ("N" in S730), the memory controller 120 may perform all or some of the map data read operations for the miss request (MISS_REQ) in sequence (S750).

Thereafter, the memory controller 120 determines whether or not the number (HIT_CNT) of hit requests (HIT_REQ) determined in operation 720 is greater than or equal to a second threshold count (S760). In this case, the second threshold count may be different from the first threshold count.

If the number (HIT_CNT) of hit requests (HIT_REQ) is greater than or equal to the second threshold count ("Y" in S760), the memory controller 120 may perform all or some of the user data read operations for the hit requests (HIT_REQ) in parallel (S770).

On the other hand, if the number (HIT_CNT) of hit requests (HIT_REQ) is less than the second threshold count ("N" in S760), the memory controller 120 may perform all or some of the user data read operations for the hit requests (HIT_REQ) in sequence (S780).

The reason why the memory controller 120 first determines the number (MISS_CNT) of miss requests (MISS_REQ), then determines whether or not the number (MISS_CNT) of miss requests (MISS_REQ) is greater than or equal to a first threshold count, and, on the basis of the same, determines whether or not to perform all or some of the map data read operations for the miss requests (MISS_REQ) in parallel as described above is as follows.

In order for the memory controller 120 to perform a plurality of operations in parallel, a queuing process is required, instead of immediately executing each of the operations at the time at which such operation is requested.

If there are a small number of operations that can be performed in parallel while it takes a long time for the queuing process, performing of the plurality of operations in parallel by the memory controller 120 may degrade performance.

For example, it is assumed that the time required to perform each operation is 10 ms when the memory controller 120 performs two different operations in parallel.

In this case, if the time required for queuing for the two operations is 30 ms, the time required for the memory controller 120 to perform two different operations in parallel becomes 30 ms+10 ms=40 ms. This is greater than 10 ms+10 ms=20 ms, which is the time required for the memory controller 120 to sequentially perform the respective operations.

Therefore, if the number of miss requests (MISS_REQ) is less than a first threshold count, the memory controller 120 may determine that it may be better for improvement of performance to sequentially perform the map data read operations for the respective miss requests (MISS_REQ), instead of performing the same in parallel.

On the other hand, if the number of miss requests (MISS_REQ) is equal to or greater than the first threshold count, the memory controller 120 may determine that performing the map data read operations for the respective miss requests (MISS_REQ) in parallel may further improve performance even though it takes time to queue for the map data read operations.

Hereinafter, an operation of performing all or some of the map data read operations for the respective miss requests (MISS_REQ) in parallel is described in detail with reference to FIGS. 8 to 10.

Figure 8:
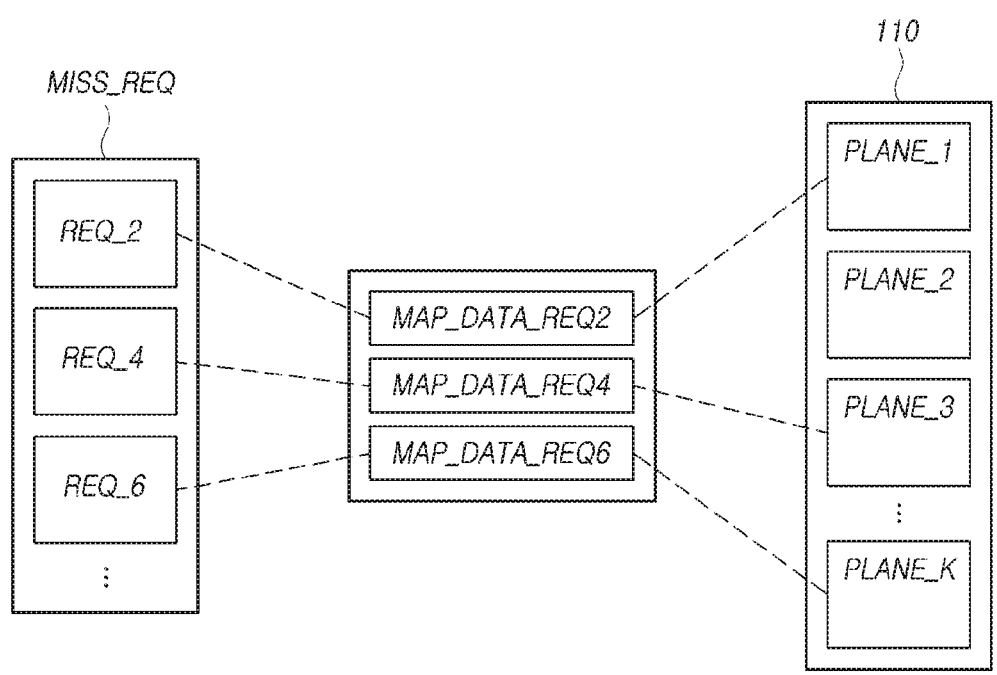
FIG. 8 is a diagram illustrating an example of a map data read operation method targeting different planes in a memory system according to an embodiment of the present disclosure.

FIG. 8 is a diagram illustrating an example of a map data read operation method targeting different planes in a memory system 100 according to an embodiment of the present disclosure.

Referring to FIG. 8, the memory controller 120 may perform all or some of map data (MAP_DATA) read operations for the miss requests (MISS_REQ), targeting different planes included in the memory device 110.

Specifically, with regard to the requests (REQ_2), (REQ_4), and (REQ_6) that are miss requests (MISS_REQ), it is assumed that the memory controller 120 processes a map data read operation (MAP_DATA_REQ2) for the request (REQ_2), a map data read operation (MAP_DATA_REQ4) for the request (REQ_4), and a map data read operation (MAP_DATA_REQ6) for the request (REQ_6) in parallel.

In this case, the MAP_DATA_REQ2 for REQ_2 is performed while targeting PLANE_1 of the memory device 110; the MAP_DATA_REQ4 for REQ_4 is performed while targeting PLANE_3 of the memory device 110; and the MAP_DATA_REQ6 for REQ_6 is performed while targeting PLANE_K of the memory device 110.

Since data stored in different pages in one plane cannot be processed at the same time, the map data (MAP_DATA) read operations for the miss requests (MISS_REQ) are performed to target different planes as described above.

That is, in order for the memory controller 120 to perform a plurality of map data read operations in parallel, the map data must be stored in different planes, so that the map data read operations for the miss requests (MISS_REQ) must be performed to different planes.

Figure 9:
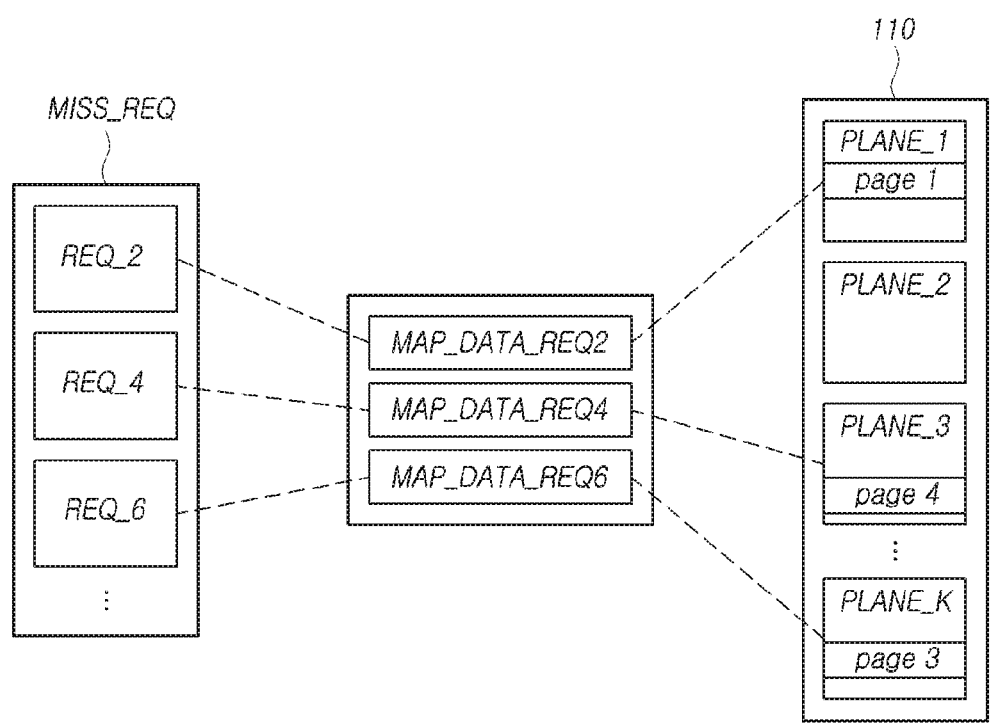
FIG. 9 is a diagram illustrating another example of a map data read operation method targeting different planes in a memory system according to an embodiment of the present disclosure.

FIG. 9 is a diagram illustrating another example of a map data read operation method targeting different planes in a memory system 100 according to an embodiment of the present disclosure.

Referring to FIG. 9, the memory controller 120 may perform all or some of map data read operations for the miss requests (MISS_REQ) while targeting different planes in the memory device 110 as shown in FIG. 8.

In this case, the pages storing the map data for the respective miss requests (MISS_REQ) may be different from each other.

More specifically, the map data for the map data read operation (MAP_DATA_REQ2) may be stored in page index 1 of the plane (PLANE_1). On the other hand, the map data for the map data read operation (MAP_DATA_REQ4) may be stored in page index 4 of the plane (PLANE_3). In addition, the map data for the map data read operation (MAP_DATA_REQ6) may be stored in page index 3 of the plane (PLANE_K).

Figure 10:
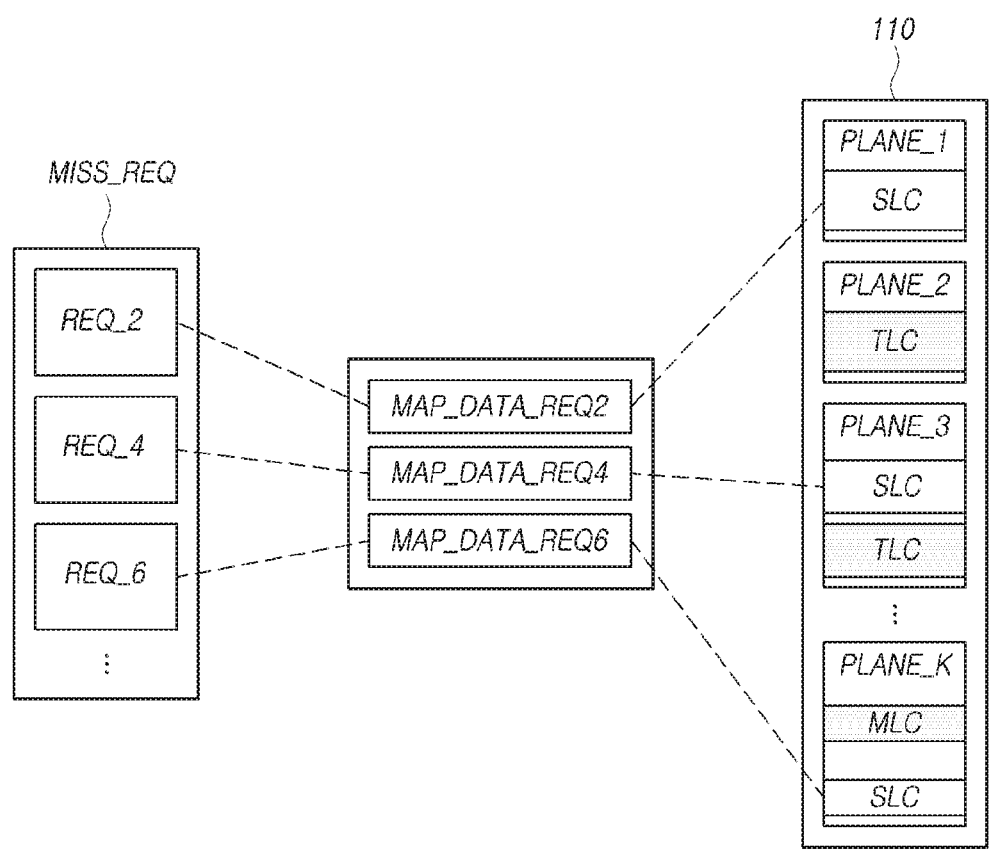
FIG. 10 is a diagram illustrating another example of a map data read operation method targeting different planes in a memory system according to an embodiment of the present disclosure.

FIG. 10 is a diagram illustrating another example of a map data read operation method targeting different planes in a memory system 100 according to an embodiment of the present disclosure.

Referring to FIG. 10, the memory controller 120 may perform all or some of map data read operations for the miss requests (MISS_REQ) while targeting different planes included in the memory device 110 as shown in FIG. 8.

In this case, the levels of the memory cells in the memory cell arrays storing map data for the respective miss requests (MISS_REQ) may be the same.

For example, in FIG. 10, the memory cell array storing map data for each miss request (MISS_REQ) may be configured of single-level cells. That is, the map data for each miss request (MISS_REQ) may be stored in a single-level cell (SLC) in the single-level memory cell array.

In FIG. 10, the map data for the map data read operation (MAP_DATA_REQ2) is stored in a single-level memory cell array in PLANE_1. The map data for the map data read operation (MAP_DATA_REQ4) is stored in a single-level memory cell array in PLANE_3. In addition, the map data for the map data read operation (MAP_DATA_REQ6) is stored in the single-level memory cell array in PLANE_K.

On the other hand, the map data is not stored in the memory cell array including multi-level cells (MLCs) or triple-level cells (TLCs).

Since the operation of reading or writing small size map data is required to be performed quickly, the memory cell array storing the map data has a single-level cell configuration as described above.

In the above, a method in which the memory controller 120 performs operations of reading map data stored in different planes in the memory device 110 in parallel has been described.

Hereinafter, a method of determining a request that hits on the map cache, among the received requests, in order to determine the map data read operation to be performed in parallel by the memory controller 120 is described in detail.

Figure 11:
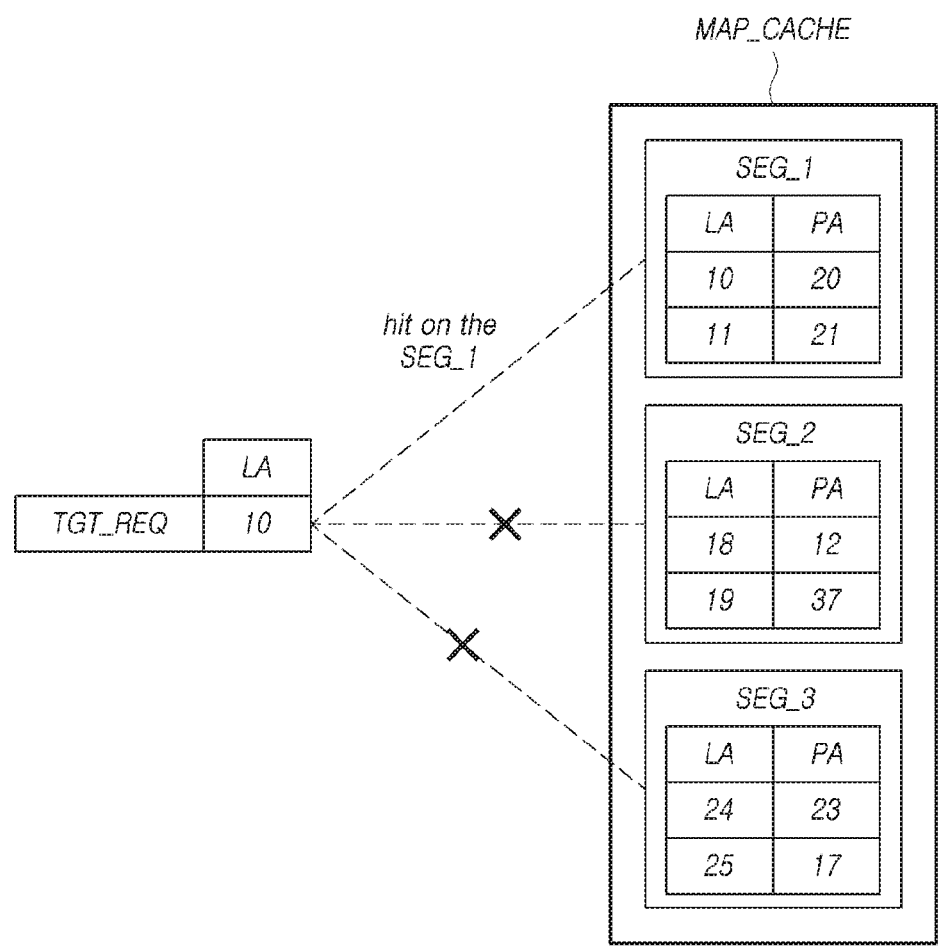
FIG. 11 is a diagram illustrating an example of an operation method of determining whether a target request hits on a map cache in a memory system according to an embodiment of the present disclosure.

FIG. 11 is a diagram illustrating an example of an operation method of determining whether or not a target request hits on a map cache in a memory system 100 according to an embodiment of the present disclosure.

Referring to FIG. 11, the memory controller 120 of the memory system 100 may determine whether or not a target request (TGT_REQ) hits on any of the map segments (SEG_1), (SEG_2), and (SEG_3) loaded in the map cache (MAP_CACHE) on the basis of a logical address area corresponding to each of these map segments.

In FIG. 11, the value of the logical address (LA) corresponding to the target request (TGT_REQ) is 10.

The map segment (SEG_1) includes information stating that the logical address (LA) 10 and the physical address (PA) 20 are mapped and information stating that logical address (LA) 11 and the physical address (PA) 21 are mapped.

The map segment (SEG_2) includes information stating that the logical address (LA) 18 and the physical address (PA) 12 are mapped and information stating that the logical address (LA) 19 and the physical address (PA) 37 are mapped.

The map segment (SEG_3) includes information stating that the logical address (LA) 24 and the physical address (PA) 23 are mapped and information stating that the logical address (LA) 25 and the physical address (PA) 17 are mapped.

In this case, since the logical address 10 corresponding to the target request (TGT_REQ) is included in the logical address areas 10 and 11 corresponding to the map segment (SEG_1), the memory controller 120 may determine that the target request (TGT_REQ) hits on the map segment (SEG_1).

On the other hand, if a value of the logical address (LA) corresponding to the target request (TGT_REQ) is 13, instead of 10, the logical address 13 is not included in any logical address area corresponding to the map segments loaded in the map cache (MAP_CACHE). Therefore, the memory controller 120 may determine that the target request (TGT_REQ) does not hit on any map segment.

In FIG. 11, the memory controller 120 searches for all mapping information of the respective map segments in order to determine whether or not the logical address corresponding to the target request (TGT_REQ) is included in the logical address area corresponding to each map segment.

In this case, the total searching time may vary depending on the total amount of mapping information included in the respective map segments. That is, as the total amount of mapping information included in the respective map segments increases, the time required to determine whether or not the logical address corresponding to the target request (TGT_REQ) is included in the logical address area corresponding to each map segment may increase.

Therefore, in order to solve this variable total searching time issue, a method in which the representative information for each map segment is generated and then the logical address corresponding to the target request (TGT_REQ) is compared with the representative information for each map segment may be used.

Hereinafter, a method of using the above-described representative information is described with reference to FIGS. 12 and 13.

Figure 12:
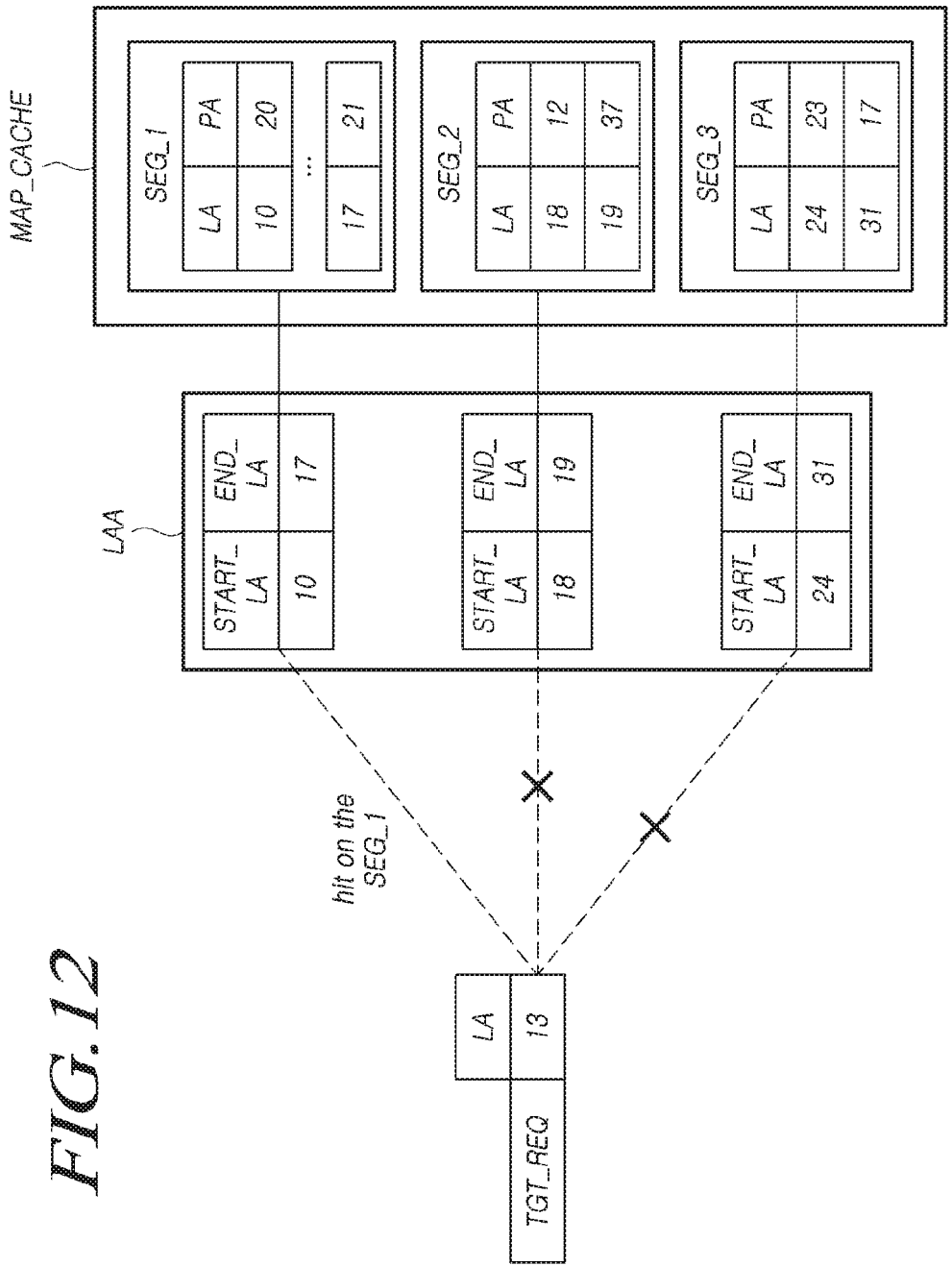
FIG. 12 is a diagram illustrating another example of an operation method of determining whether a target request hits on a map cache in a memory system according to an embodiment of the present disclosure.

FIG. 12 is a diagram illustrating another example of an operation method of determining whether or not a target request hits on a map cache in a memory system 100 according to an embodiment of the present disclosure.

Referring to FIG. 12, if a logical address (LA) corresponding to a target request (TGT_REQ) is included in any of the logical address areas corresponding to the respective map segments (SEG_1), (SEG_2), and (SEG_3) loaded in the map cache (MAP_CACHE), the memory controller 120 of the memory system 100 may determine that the target request (TGT_REQ) hits on any of such map segment.

In FIG. 12, the value of the logical address (LA) corresponding to the target request (TGT_REQ) is 13.

In this case, the memory controller 120 may generate logical address area information (LAA) indicating a logical address area of each map segment with respect to the respective map segments loaded in the map cache (MAP_CACHE), and may use the generated logical address area information (LAA) as representative information corresponding to the respective map segments.

In this case, the logical address area information (LAA) for the respective map segments may be expressed in any of various ways. For example, the logical address area information (LAA) may be expressed as a pair of a start-logical address (START_LA) and an end-logical address (END_LA).

Specifically, in FIG. 12, the map segment (SEG_1) loaded in the map cache (MAP_CACHE) includes mapping information about a logical address area between the logical address (LA) 10 and the logical address (LA) 17. In this case, the start-logical address (START_LA) of the logical address area corresponding to the map segment (SEG_1) is 10, and the end-logical address (END_LA) thereof is 17. Accordingly, the logical address area information (LAA) on the map segment (SEG_1) may be expressed as (10, 17).

In addition, the map segment (SEG_2) loaded in the map cache (MAP_CACHE) includes mapping information about the logical address area between the logical address (LA) 18 and the logical address (LA) 19. In this case, the start-logical address (START_LA) of the logical address area corresponding to the map segment (SEG_2) is 18, and the end-logical address (END_LA) thereof is 19. Therefore, the logical address area information (LAA) on the map segment (SEG_2) may be expressed as (18, 19).

In addition, the map segment (SEG_3) loaded in the map cache (MAP_CACHE) includes mapping information about a logical address area between the logical address (LA) 24 and the logical address (LA) 31. In this case, the start-logical address (START_LA) of the logical address area corresponding to the map segment (SEG_3) is 24, and the end-logical address (END_LA) thereof is 31. Accordingly, the logical address area information (LAA) on the map segment (SEG_3) may be expressed as (24, 31).

In this case, the memory controller 120 may determine the logical address area of the map segment, among the map segments (SEG_1), (SEG_2), and (SEG_3), which includes the logical address (LA) corresponding to the target request (TGT_REQ) on the basis of the logical address area information (LAA) on the respective map segments.

In FIG. 12, the logical address (LA) corresponding to the target request (TGT_REQ) has a value of 13 between 10, which is the start-logical address (START_LA) of the map segment (SEG_1), and 17, which is the end-logical address (END_LA) thereof. Therefore, the memory controller 120 may determine that the target request (TGT_REQ) hits on the map segment (SEG_1), among the map segments (SEG_1), (SEG_2), and (SEG_3) loaded in the map cache (MAP_CACHE).

Using this method, the memory controller 120 does not need to search for all mapping information in the respective map segments loaded in the map cache (MAP_CACHE). Accordingly, the memory controller 120 is able to quickly search for respective ones of the map segments loaded in the map cache (MAP_CACHE) on which the respective ones of the plurality of requests are hit.

In this case, however, the mapping information included in the respective map segments must correspond to consecutive logical address areas such that the logical address area information (LAA) is able to be expressed as a pair of a start-logical address (START_LA) and an end-logical address (END_LA).

Figure 13:
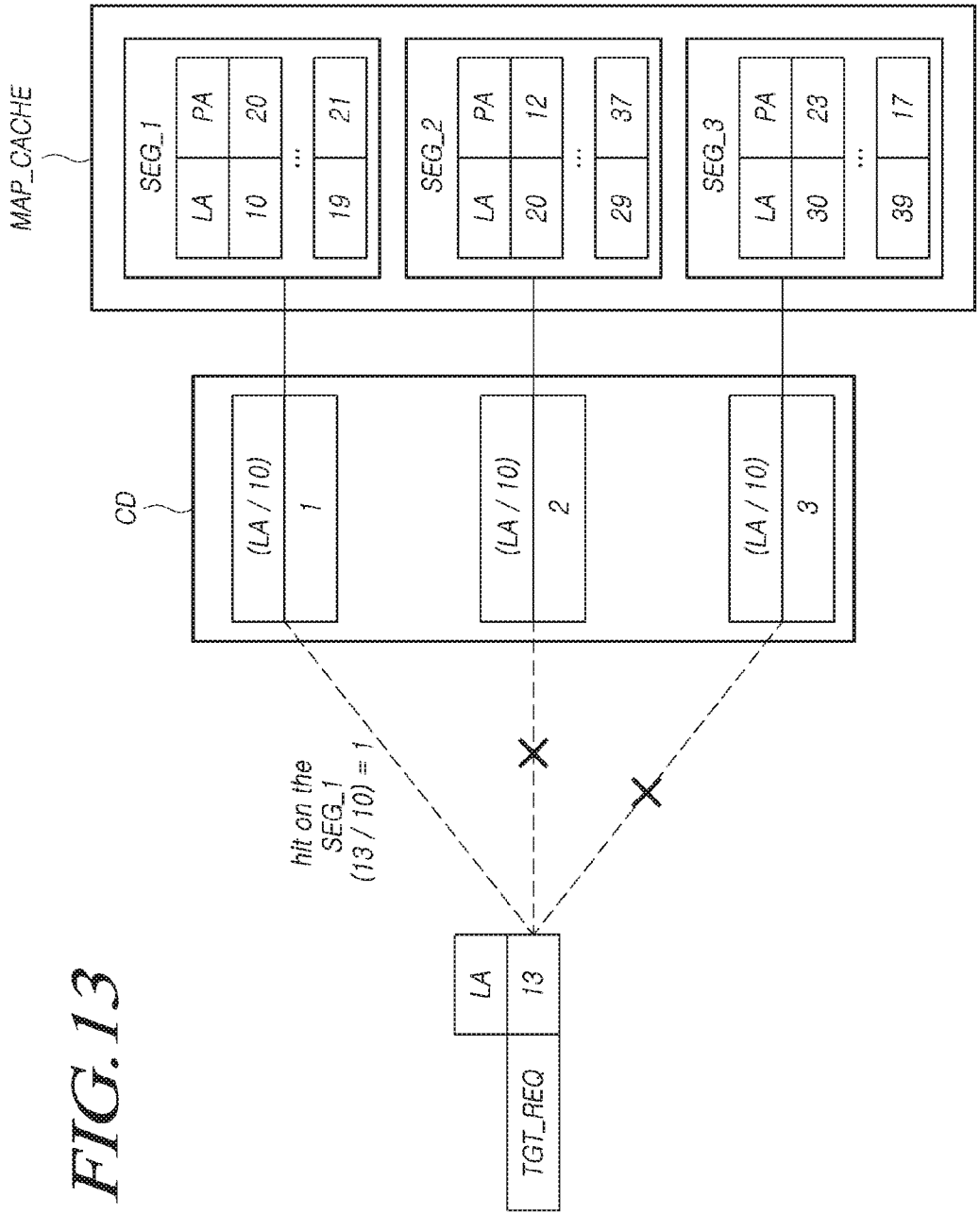
FIG. 13 is a diagram illustrating another example of an operation method of determining whether a target request hits on a map cache in a memory system according to an embodiment of the present disclosure.

FIG. 13 is a diagram illustrating another example of an operation method of determining whether or not a target request hits on a map cache in a memory system 100 according to an embodiment of the present disclosure.

Referring to FIG. 13, if a code determined on the basis of the logical address (LA) corresponding to a target request (TGT_REQ) matches any of the codes corresponding to the respective map segments (SEG_1), (SEG_2), and (SEG_3) loaded in the map cache (MAP_CACHE), the memory controller 120 of the memory system 100 may determine that the target request (TGT_REQ) hits on any of such map segments.

In this case, the code (CD) may be determined in any of various ways. For example, the code (CD) may be determined to be a result value obtained by performing an operation (e.g., a modular operation/quotient operation) set in the logical address.

Hereinafter, it is assumed that the code (CD) is determined by the quotient obtained by dividing the logical address value by ten in FIG. 13.

In FIG. 13, since the logical address corresponding to the target request (TGT_REQ) is 13, the code (CD) value corresponding to the target request (TGT_REQ) is 13/10=1.

In this case, the memory controller 120 may calculate codes for the respective map segments loaded in the map cache (MAP_CACHE) as follows, and may use the calculated codes as representative information corresponding to the respective map segments.

The map segment (SEG_1) loaded in the map cache (MAP_CACHE) includes mapping information on a logical address between the logical address (LA) 10 and the logical address (LA) 19. In this case, since the quotients obtained by dividing the logical address values 10 to 19 by 10 are all 1, the value of the code (CD) corresponding to the map segment (SEG_1) is 1.

The map segment (SEG_2) loaded in the map cache (MAP_CACHE) includes mapping information on the logical address between the logical address (LA) 20 and the logical address (LA) 29. In this case, since the quotients obtained by dividing the logical address values 20 to 29 by 10 are all 2, the value of the code (CD) corresponding to the map segment (SEG_2) is 2.

The map segment (SEG_3) loaded in the map cache (MAP_CACHE) includes mapping information on the logical address between the logical address (LA) 30 and the logical address (LA) 39. In this case, since the quotients obtained by dividing the logical address values 30 to 39 by 10 are all 3, the value of the code (CD) corresponding to the map segment (SEG_3) is 3.

Accordingly, the memory controller 120 may determine that the target request (TGT_REQ) hits on the map segment (SEG_1) having the same code (CD) value of 1, among the map segments (SEG_1), (SEG_2), and (SEG_3) loaded in the map cache (MAP_CACHE). In this case, the memory controller 120 does not need to search for all mapping information included in the respective map segments loaded in the map cache (MAP_CACHE).

Representative information of the respective map segments, such as the information on the logical address areas (LAA) for the respective map segments described in FIG. 12 and the code (CD) information on the respective map segments described in FIG. 13, may be stored in any of various data structures (e.g., list/table/hash) separate from the map segments.

In addition, the memory controller 120 may compare the representative information (stored in any the above-described data structures) on the respective map segments with the target request (TGT_REQ) using a separate search circuit in the memory controller 120. The search circuit may be implemented as a separate logic circuit instead of firmware.

Figure 14:
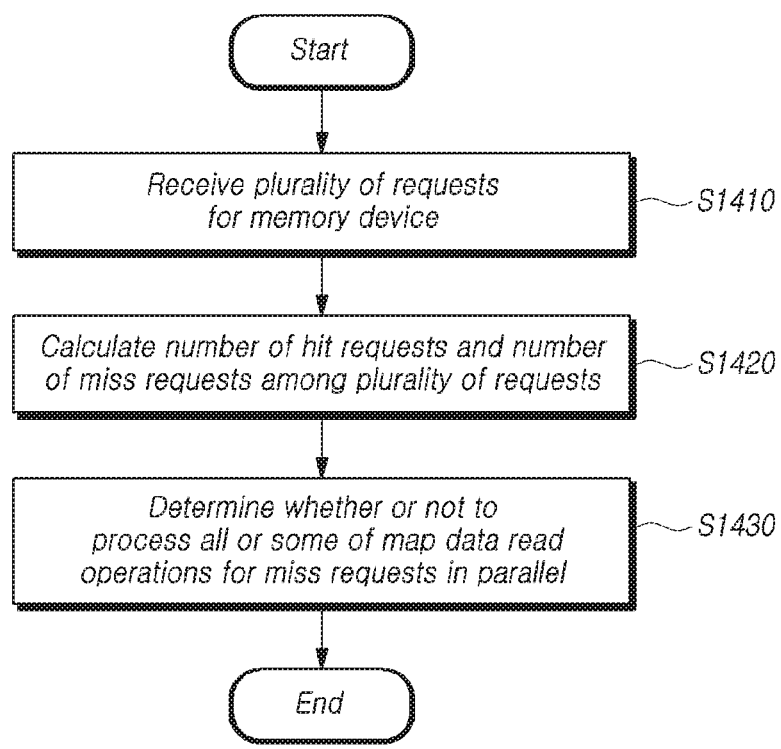
FIG. 14 is a flowchart illustrating a method of operating a memory system according to an embodiment of the present disclosure.

FIG. 14 is a flowchart illustrating a method of operating a memory system 100 according to an embodiment of the present disclosure.

The operation method of the memory system 100 may include a step (S1410) of receiving a plurality of requests for the memory device 110.

The operation method of the memory system 100 may include a step (S1420) of determining the number of hit requests and the number of miss requests, among the plurality of requests received in operation S1410. In this case, a hit request means a request that hits on any of the map segments loaded in the map cache, and a miss request means a request that does not hit on any of the map segments loaded in the map cache as described above.

The operation method of the memory system 100 may include a step (S1430) of determining whether or not to perform all or some of map data read operations for the respective miss requests in parallel and whether or not to perform all or some of user data read operations for the respective hit requests in parallel.

The operation of the memory controller 120 described above may be controlled by the control circuit 123, and may be performed in such a manner that the processor 124 executes (drives) firmware in which all operations of the memory controller 120 are programmed.

Figure 15:
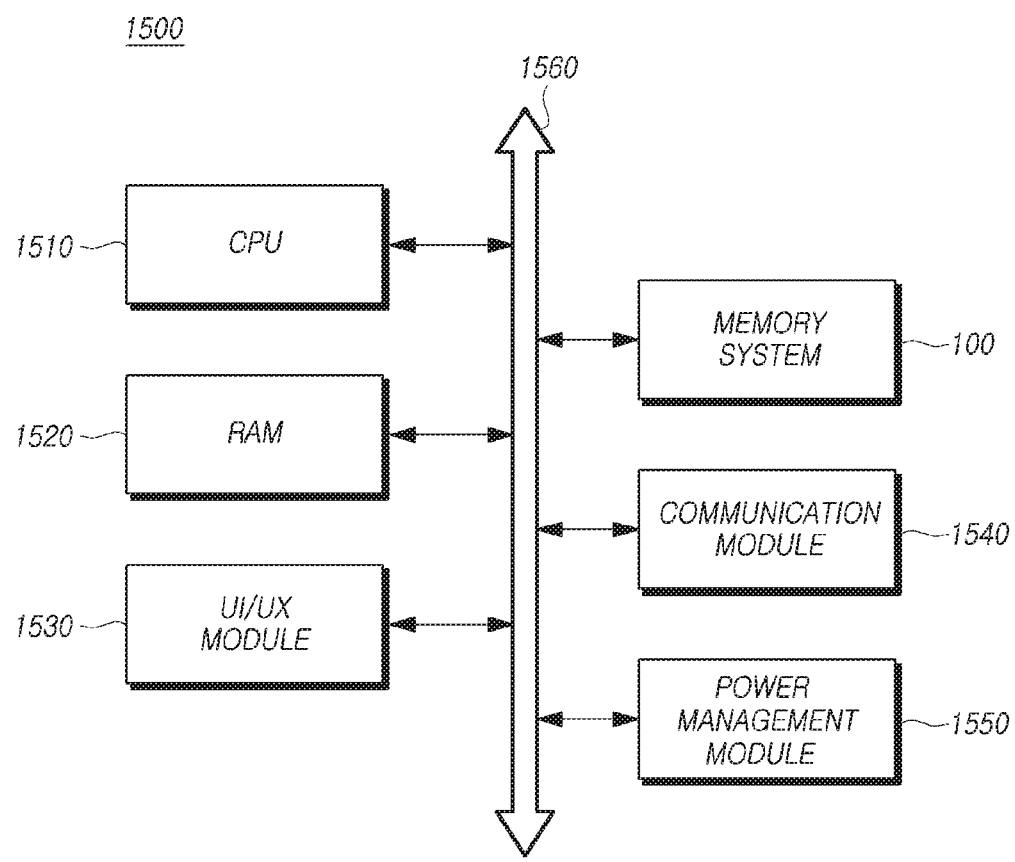
FIG. 15 is a diagram illustrating the configuration of a computing system according to an embodiment of the present disclosure.

FIG. 15 is a diagram illustrating the configuration of a computing system 1500 according to an embodiment of the present disclosure.

Referring to FIG. 15, a computing system 1500 may include a memory system 100 electrically connected to a system bus 1560, a central processing unit (CPU) 1510 for controlling overall operation of the computing system 1500, a RAM 1520 for storing data and information related to the operation of the computing system 1500, a user interface/user experience (UI/UX) module 1530 for providing a user with a user environment, a communication module 1540 for communicating with an external device through wired and/or wireless communication, a power management module 1550 for managing power used by the computing system 1500, and the like.

The computing system 1500 may be a personal computer (PC), or may include a mobile terminal, such as a smart phone, a tablet PC, or various other electronic devices.

The computing system 1500 may further include a battery for supplying an operating voltage, and may further include an application chipset, a graphics-related module, a camera image processor (CIS), a DRAM, and the like. As those skilled in the art will understand, the computing system 1500 may include other components.

The memory system 100 may include a device for storing data in a non-volatile memory, such as a solid state drive (SSD), a universal flash storage (UFS) device, an embedded MMC (eMMC) device, or the like, as well as a device for storing data in a magnetic disk, such as a hard disk drive (HDD). The non-volatile memory may include read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. In addition, the memory system 100 may be implemented as any of various types of storage devices, and may be mounted to any of various electronic devices.

According to embodiments of the present disclosure described above, it is possible to minimize a time required to process a plurality of requests.

In addition, according to embodiments of the present disclosure, it is possible to quickly determine the number of requests that hit on the map cache and the number of requests that miss, i.e., do not hit on any map cache. Although various embodiments of the present disclosure have been illustrated and described, those skilled in the art will appreciate in light of the present disclosure that various modifications, additions and substitutions are possible, without departing from the scope and spirit of the invention as defined in the accompanying claims. Therefore, while various embodiments of the present disclosure have been described, the scope of the present invention encompasses all technical configurations that fall within the scope of the claims including their equivalents.

What is claimed is:

1. A memory system comprising:
a memory device comprising a plurality of planes; and
a memory controller configured to:
receive a plurality of requests for the memory device;
determine, among the plurality of requests, a number of hit requests that hit on any of map segments loaded in a map cache and a number of miss requests that do not hit on any of the map segments loaded in the map cache; and
determine, based on the number of hit requests and the number of miss requests, whether or not to perform all or some of map data read operations for the respective miss requests in parallel and whether or not to perform all or some of user data read operations for the respective hit requests in parallel.

2. The memory system of claim 1, wherein the memory controller is configured to perform, when the number of the miss requests is greater than or equal to a first threshold count, all or some of the map data read operations for the miss requests in parallel.

3. The memory system of claim 2, wherein the memory controller performs all or some of the map data read operations for the miss requests on different planes in the memory device.

4. The memory system of claim 3, wherein pages in which map data for the respective miss requests is stored are different from each other.

5. The memory system of claim 1, wherein a memory cell array in which map data for each of the miss requests is stored is configured of single-level cells.

6. The memory system of claim 1, wherein the memory controller is configured to perform, if the number of hit requests is greater than or equal to a second threshold count, all or some of the user data read operations for the hit request in parallel.

7. The memory system of claim 1, wherein the memory controller is configured to determine whether or not a target request, among the plurality of requests, hits on any of the map segments loaded in the map cache, based on a logical address area corresponding to each of the map segments loaded in the map cache.

8. The memory system of claim 1, wherein the memory controller is configured to determine whether or not a target request, among the plurality of requests, hits on any of the map segments loaded in the map cache, based on representative information corresponding to each of the map segments loaded in the map cache.

9. The memory system of claim 8, wherein the representative information corresponding to each of the map segments comprises a start-logical address and an end-logical address of a logical address area for each of the map segments.

10. The memory system of claim 8, wherein the representative information corresponding to each of the map segments comprises a code, which is a result value obtained by performing an operation on a logical address included in each of the map segments.

11. A memory controller comprising:
a memory interface configured to communicate with a memory device comprising a plurality of planes; and
a control circuit configured to:
receive a plurality of requests for the memory device;
determine, among the plurality of requests, a number of hit requests that hit on any of map segments loaded in a map cache and a number of miss requests that do not hit on any of the map segments loaded in the map cache; and
determine, based on the number of hit requests and the number of miss requests, whether or not to perform all or some of map data read operations for the respective miss requests in parallel and whether or not to perform all or some of user data read operations for the respective hit requests in parallel.

12. The memory controller of claim 11, wherein the control circuit is configured to perform, when the number of the miss requests is greater than or equal to a first threshold count, all or some of the map data read operations for the miss requests in parallel.

13. The memory controller of claim 12, wherein the control circuit performs all or some of the map data read operations for the miss requests on different planes included in the memory device.

14. The memory controller of claim 13, wherein the pages in which map data for the respective miss requests is stored are different from each other.

15. The memory controller of claim 11, wherein a memory cell array in which map data for each of the miss requests is stored is configured of single-level cells.

16. The memory controller of claim 11, wherein the control circuit is configured to determine whether or not a target request, among the plurality of requests, hits on any of the map segments loaded in the map cache, based on a logical address area corresponding to each of the map segments loaded in the map cache.

17. The memory controller of claim 11, wherein the control circuit is configured to determine whether or not a target request, among the plurality of requests, hits on any of the map segments loaded in the map cache, based on representative information corresponding to each of the map segments loaded in the map cache.

18. The memory controller of claim 17, wherein the representative information corresponding to each of the map segments comprises a start-logical address and an end-logical address of a logical address area for each of the map segments.

19. The memory controller of claim 17, wherein the representative information corresponding to each of the map segments comprises a code, which is a result value obtained by performing an operation on a logical address included in each of the map segments.

20. A method of operating a memory system comprising a memory device comprising a plurality of planes and a memory controller configured to control the memory device, the method comprising:
receiving, by the memory controller, a plurality of requests for the memory device;
determining, among the plurality of requests, the number of hit requests that hit on any of map segments loaded in a map cache and the number of miss requests that do not hit on one of the map segments loaded in the map cache; and
determining, based on the number of hit requests and the number of miss requests, whether or not to perform all or some of map data read operations for the respective miss requests in parallel and whether or not to perform all or some of user data read operations for the respective hit requests in parallel.

* * * * *